(12) United States Patent
Joshi

(10) Patent No.: US 10,381,654 B2
(45) Date of Patent: Aug. 13, 2019

(54) METHODS OF PREPARING ELECTRODES HAVING TARGETED OXYGEN TRANSPORT

(71) Applicant: Nissan North America, Inc., Franklin, TN (US)

(72) Inventor: Tapesh Joshi, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 171 days.

(21) Appl. No.: 15/424,584

(22) Filed: Feb. 3, 2017

(65) Prior Publication Data

US 2018/0226656 A1    Aug. 9, 2018

(51) Int. Cl.
| | |
|---|---|
| *H01M 4/88* | (2006.01) |
| *H01M 8/026* | (2016.01) |
| *H01M 8/0234* | (2016.01) |
| *H01M 8/0258* | (2016.01) |
| *H01M 8/0265* | (2016.01) |
| *H01M 8/1018* | (2016.01) |

(52) U.S. Cl.
CPC ......... *H01M 4/8878* (2013.01); *H01M 4/881* (2013.01); *H01M 4/8807* (2013.01); *H01M 4/8825* (2013.01); *H01M 8/026* (2013.01); *H01M 8/0234* (2013.01); *H01M 8/0258* (2013.01); *H01M 8/0265* (2013.01); *H01M 2008/1095* (2013.01)

(58) Field of Classification Search
None
See application file for complete search history.

(56) References Cited

U.S. PATENT DOCUMENTS

| | | |
|---|---|---|
| 2002/0132156 A1 | 9/2002 | Ruhl et al. |
| 2004/0038808 A1 | 2/2004 | Hampden-Smith et al. |
| 2007/0111072 A1 | 5/2007 | Wayne et al. |
| 2011/0159396 A1 | 6/2011 | Kleemann et al. |
| 2012/0321995 A1* | 12/2012 | Roof .................... H01M 4/881 429/523 |
| 2015/0211132 A1 | 7/2015 | MacKinnon et al. |
| 2016/0032472 A1 | 2/2016 | Skou et al. |

FOREIGN PATENT DOCUMENTS

| | | |
|---|---|---|
| JP | 2011158324 A | 8/2011 |
| WO | 2015025147 A1 | 2/2015 |

* cited by examiner

*Primary Examiner* — Daniel S Gatewood
(74) *Attorney, Agent, or Firm* — Young Basile Hanlon & MacFarlane, P.C.

(57) ABSTRACT

A method of preparing an electrode having targeted oxygen transport comprises applying a catalyst layer having active catalyst particles on a substrate, scanning the applied catalyst layer to detect the active catalyst particles in the catalyst layer, mapping the detected active catalyst particles, and forming a gas diffusion layer configured to concentrate gas distribution to the detected active catalyst particles based on the map.

20 Claims, 5 Drawing Sheets

METHODS OF PREPARING ELECTRODES HAVING TARGETED OXYGEN TRANSPORT

TECHNICAL FIELD

This disclosure relates to electrodes for fuel cells having targeted oxygen transport and methods of making the same.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant.

Fuel cells have membrane electrode assemblies comprising a membrane with an anode on one side and a cathode on the other side. On the anode side, the catalyst enables hydrogen molecules to be split into protons and electrons. On the cathode side, the catalyst enables oxygen reduction by reacting with the protons generated by the anode, producing water. Due to pressure to reduce cost of fuel cells, amounts of active catalyst material such as platinum have been reduced while balancing fuel cell efficiency. Poor oxygen transport to the active catalyst particles impacts the efficiency of the fuel cell.

SUMMARY

Disclosed herein are methods of preparing an electrode having targeted oxygen transport. One method disclosed herein comprises applying a catalyst layer having active catalyst particles on a substrate, scanning the applied catalyst layer to detect the active catalyst particles in the catalyst layer, mapping the detected active catalyst particles, and forming a gas diffusion layer configured to concentrate gas distribution to the detected active catalyst particles based on the map.

Another method of preparing an electrode having targeted oxygen transport as disclosed herein comprises applying a catalyst layer having active catalyst particles on an electrode membrane, scanning the applied catalyst layer to detect the active catalyst particles, mapping the detected active catalyst particles, forming a carbon layer having a gas distribution pattern configured to concentrate gas flow to the detected active catalyst particles based on the map, layering the carbon layer on the catalyst layer opposite the electrode membrane, and providing a gas diffusion plate on the carbon layer, the gas diffusion plate having gas flow channels configured to deliver gas from an oxidant supply to the catalyst layer.

Also disclosed are electrodes having targeted oxygen transport.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
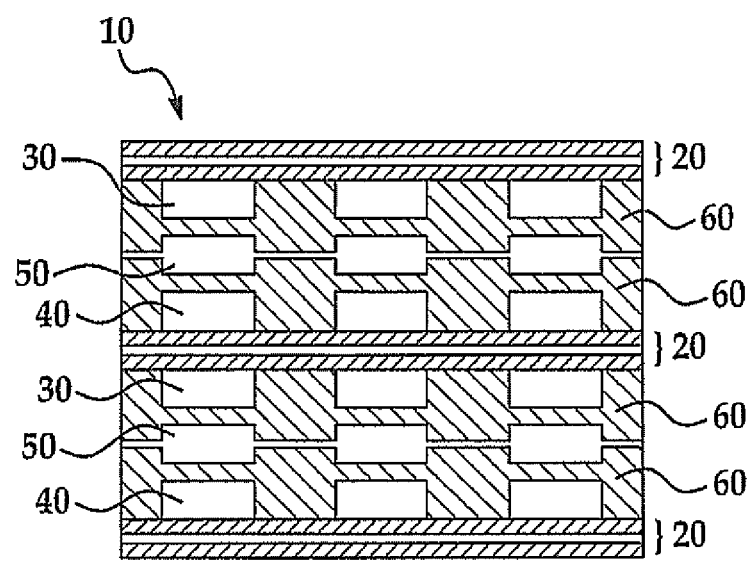
FIG. 1 is a schematic of a cross-section of a fuel cell stack.

FIG. 1 shows a schematic cross-sectional illustration of a portion of a fuel cell stack 10. The illustration is provided as an example and is not meant to be limiting. The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
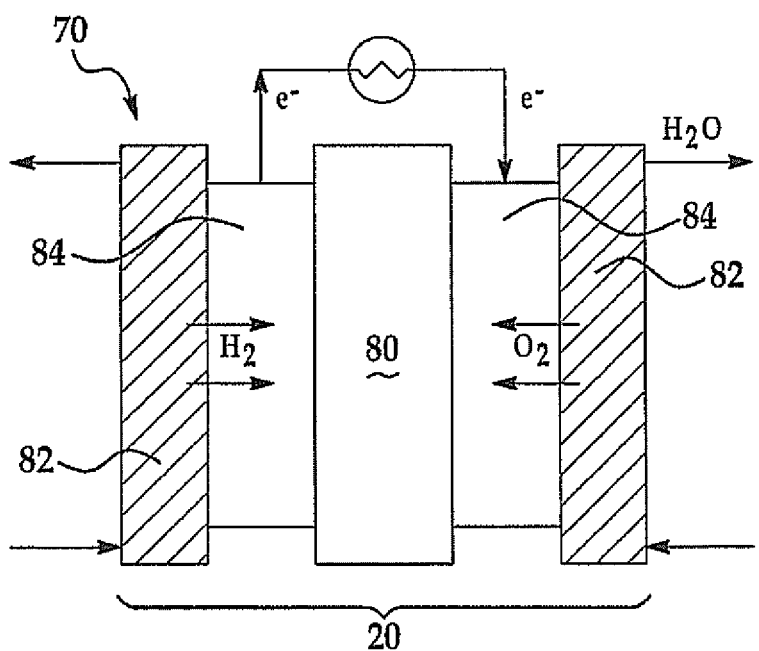
FIG. 2 is schematic of a membrane electrode assembly.

FIG. 2 is an illustration of one of the plurality of fuel cells 70 in the fuel cell stack 10. The fuel cell 70 is comprised of a single membrane electrode assembly 20. The membrane 80 has a catalyst layer 84 formed on opposing surfaces of the membrane 80, such that when assembled, the catalyst layers 84 are each between the membrane 80 and a gas diffusion layer 82. Alternatively, a gas diffusion electrode is made by forming a catalyst layer 84 on a surface of each of two gas diffusion layers 82 and sandwiching the membrane 80 between the gas diffusion layers 82 such that the catalyst layers 84 contact the membrane 80.

Fuel cell catalyst typically comprises a support material such as carbon or another conductive material, with an active catalyst material supported on the support material. The active catalyst material can be platinum or other noble metals, transition metals, metal oxides, or alloys or a combination thereof. Non-limiting examples of active catalyst material include Pt, Pt—Co, Pt—Ni, Pt—Cu and Pt—Fe. The catalyst is typically mixed with an ionomer and sprayed or otherwise layered on one of the membrane 80 and the gas diffusion layer 82 to form the catalyst layer 84. Due in part to the cost of the active catalyst material, as little as possible is used to achieve the requisite fuel cell performance. The active catalyst material may not be distributed uniformly across the area of the catalyst layer 84, and also may not be distributed uniformly throughout the thickness of the catalyst layer 84. Oxygen in the oxidant 40 is required at the site of the active catalyst material for the reduction reaction. Typical gas diffusion layers 82 uniformly provide oxidant to the entire catalyst layer 84, leaving areas with a higher concentration of active catalyst material lacking oxygen while flooding areas with low concentration of active catalyst material with oxygen.

To accommodate the non-uniform distribution of active catalyst material in the catalyst layer 84, disclosed herein are electrodes having gas diffusion layers with modified flow channels that target the active catalyst material, improving oxygen transport and increasing the fuel cell efficiency. Also disclosed are methods of making the electrodes with the modified flow channels.

Figure 3:
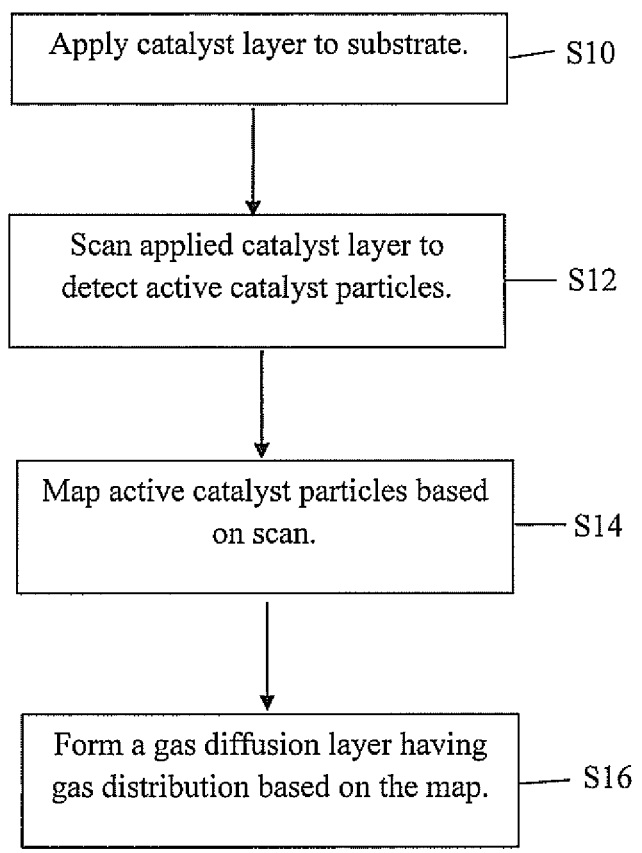
FIG. 3 is a flow diagram of a method of making an electrode as disclosed herein.

One method of preparing an electrode 100 having targeted oxygen transport is shown in FIG. 3. In step S10, a catalyst layer 102 having active catalyst particles 104 is applied to a substrate. In step S12, the applied catalyst layer 102 is scanned to detect the active catalyst particles 104 in the catalyst layer 102. The detected active catalyst particles 104 are mapped in step S14. A gas diffusion layer is formed in step S16, the gas diffusion layer configured to concentrate gas distribution to the detected active catalyst particles 104 based on the map 106.

The substrate can be a membrane, a gas diffusion layer or another substrate from which the catalyst layer is transferred to one of the membrane and the gas diffusion layer. The catalyst layer 102 can be applied using any method known to those skilled in the art. Non-limiting examples include spraying, ink jetting, ionomer impregnation, electrodeposition, decal transfer, and spreading.

The catalyst layer 102 can be scanned using a scanning electron microscope, as a non-limiting example, to detect an element designating the active catalyst particles, such as platinum. As another example, laser scanning fluorescence microscopy can be used. The active catalyst particles 104 can be deposited or otherwise tagged with a fluorescent material prior to preparing the catalyst and applying the catalyst layer 102. The active catalyst particles 104 are fluoresced, and detected with the fluorescence microscope. Other techniques for detecting material such as that used in as an active catalyst material can be used as known to those skilled in the art.

The scanning can produce a two dimensional map that depicts the location of the active catalyst particles 104 along a surface area of the catalyst layer 102 without indicating a depth of the active catalyst particles 104 in the catalyst layer 102. The map can also depict a size of the detected active catalyst particle 104. The scanning may also produce a three dimensional map that depicts the location of the active catalyst particles 104 along the surface area of the catalyst layer 102 and a depth of the active catalyst particles 104 in the catalyst layer 102. Catalyst layers 102 typically have a thickness ranging between three and fifteen microns. Oxidant can be directed to the active catalyst particles 104 based on one or more of location, depth, and size. The map 106 can represent depth using different hues or colors, for example, to represent different depths. The larger the active catalyst particle 104, the greater the amount of oxidant 40 directed to the particle 104. The deeper the active catalyst particle 104, the greater the amount of oxidant 40 directed to the particle 104.

The map 106 is created based on the active catalyst particles 104 detected by scanning. The scanning and mapping steps may be performed as a single step, such as when the scanning electronically creates output from the scan. It is contemplated that the mapping step may not be explicitly necessary in some of the embodiments, as discussed below.

In some embodiments, forming the gas diffusion layer to concentrate gas distribution can comprise forming the gas distribution layer with varying porosity based on the map 106. Porosity can be formed based on the mapped locations of the active catalyst particles 104. The porosity can also vary with the depth and size of active catalyst particles 104. The greater the depth and size of active catalyst particles 104, the greater the porosity to direct more oxidant to the active catalyst particles 104.

Figure 4:
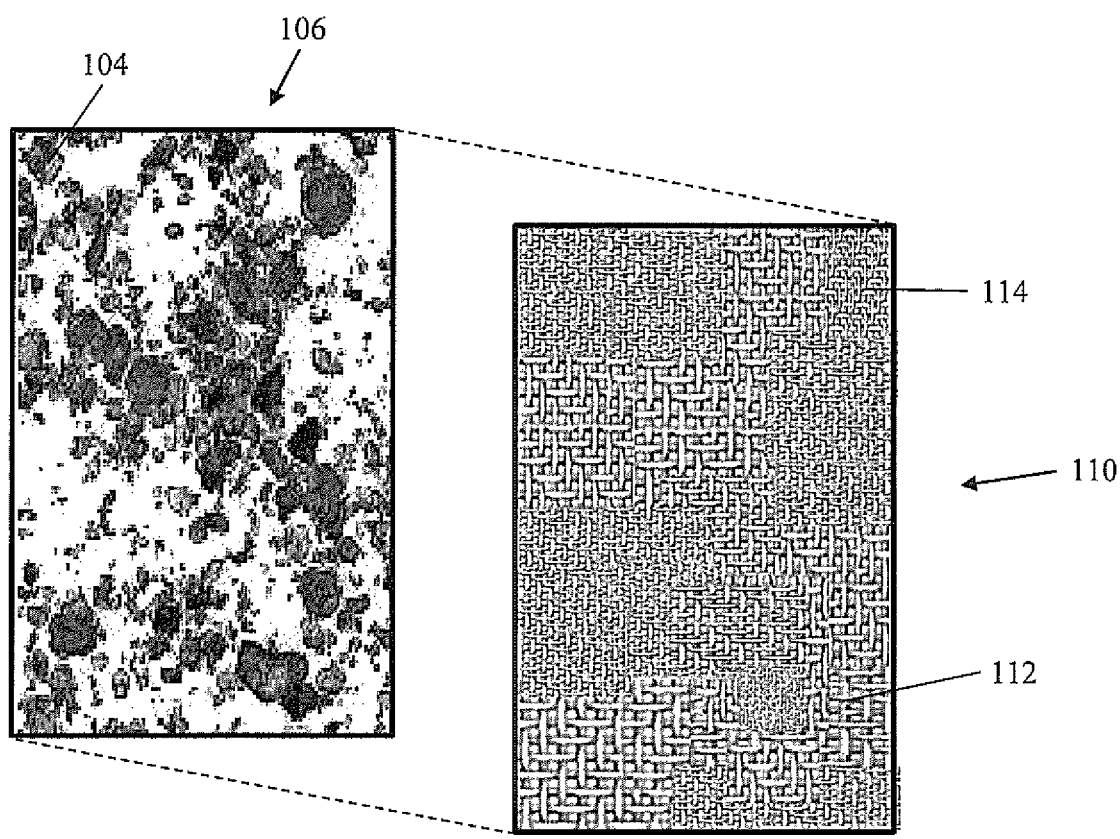
FIG. 4 is a schematic of a map of active catalyst particles and a corresponding gas diffusion layer.

As illustrated in FIGS. 4 and 5A-C, the gas diffusion layer can be woven or unwoven carbon fiber. FIG. 4 illustrates the map 106 of active catalyst particles 104, with darker hues representing proximity to the scanned surface. FIG. 4 also illustrates a gas diffusion layer 110 of woven carbon fiber. The gas diffusion layer 110 is made with varying densities of fiber, the density of the fibers increasing in areas as the concentration of active catalyst particles 104 decreases in those areas. The less dense the fibers, the greater the oxidant flow through the gas diffusion layer 110. FIG. 4 illustrates a gas diffusion layer 110 having varying densities of fiber. For example, a first density 112 of fibers is used where the active catalyst particles 104 are concentrated on the map 106 and a second density 114 of fibers is used where the active catalyst particles 104 are not concentrated on the map 106, the first density 112 being less than the second density 114.

Figure 5A:
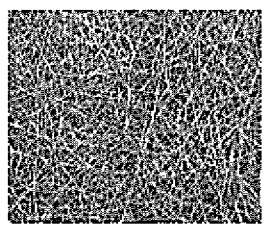
FIGS. 5A-5C are examples of different fiber densities for unwoven carbon fiber.
Figure 5B:
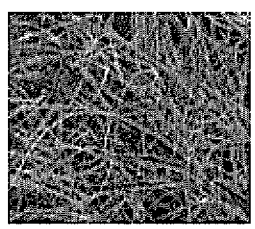
Figure 5C:
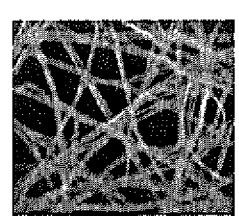

FIGS. 5A-C illustrate unwoven carbon fiber in with varying densities of fiber. FIG. 5A is a denser fiber and would be used to correspond with a low concentration of active catalyst particles 104, while FIG. 5C has less dense fibers for use where the concentration of active catalyst particles 104 is high.

The gas diffusion layer 110 using carbon fiber can be produced, for example, by using carbon fibers of the same diameter but with the tightness of the weave varying to produce the desired fiber density. As another example, different diameters of carbon fibers can be used with the same tightness of the weave, with larger diameter fibers resulting in a higher fiber density and less porosity.

Figure 6:
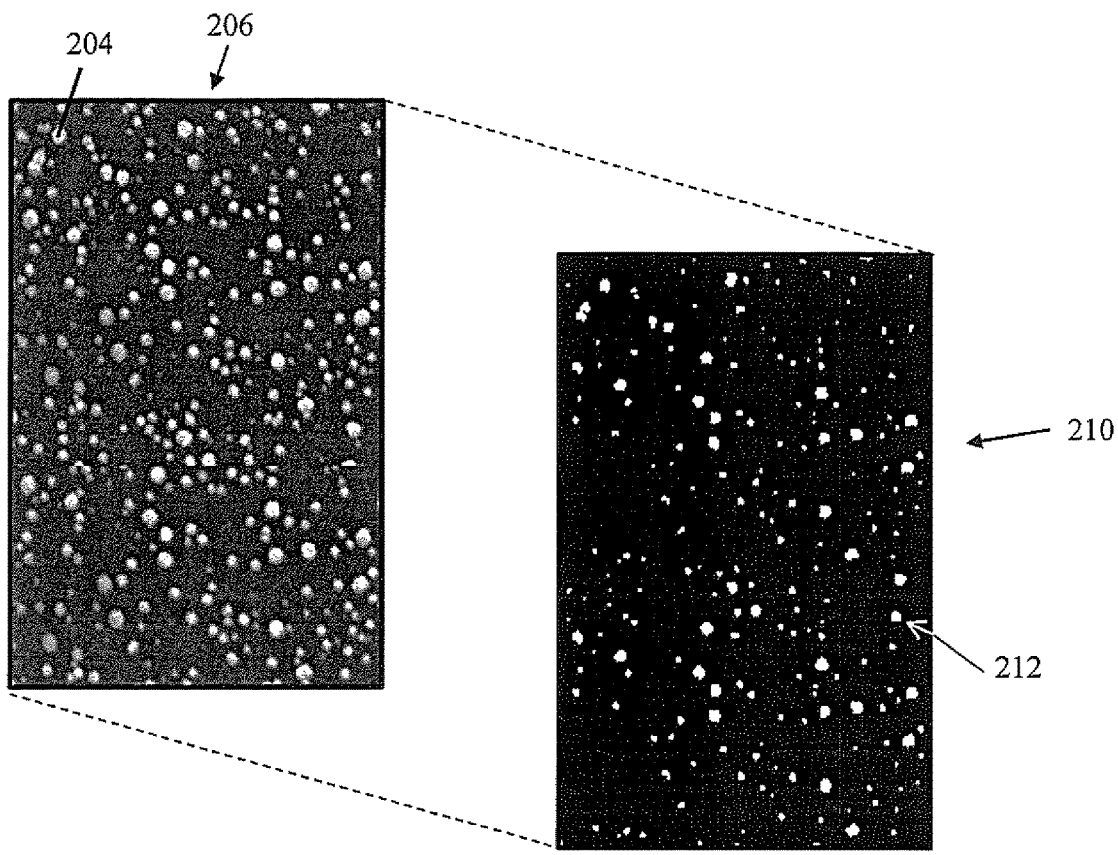
FIG. 6 is another schematic of a map of active catalyst particles and a corresponding gas diffusion layer.

The gas diffusion layer can be carbon paper. A map 206 produced by a different scan is shown in FIG. 6. The gas diffusion layer 210 targets gas distribution to the active catalyst particles 204 using apertures 212 or pores produced in the carbon paper. The apertures 212 can be formed to correspond directly to the map 206 of the active catalyst particles 204 as illustrated in FIG. 6. As shown, the location of the apertures 212 across the surface area of the gas diffusion layer 212 corresponds directly to the location of the active catalyst particles 204. The diameter of the apertures 212 also corresponds to the diameter of the active catalyst particles 204 detected. However, the diameter of the apertures 212 can be consistent across the surface area of the gas diffusion layer 210. The depth of the active catalyst particles 104 is not included in the sizing of the apertures 212 in FIG. 6. However, the depth can be used in the determination of oxidant flow, with the apertures 212 formed larger as the depth of the active catalyst particles 104 increases.

Figure 7:
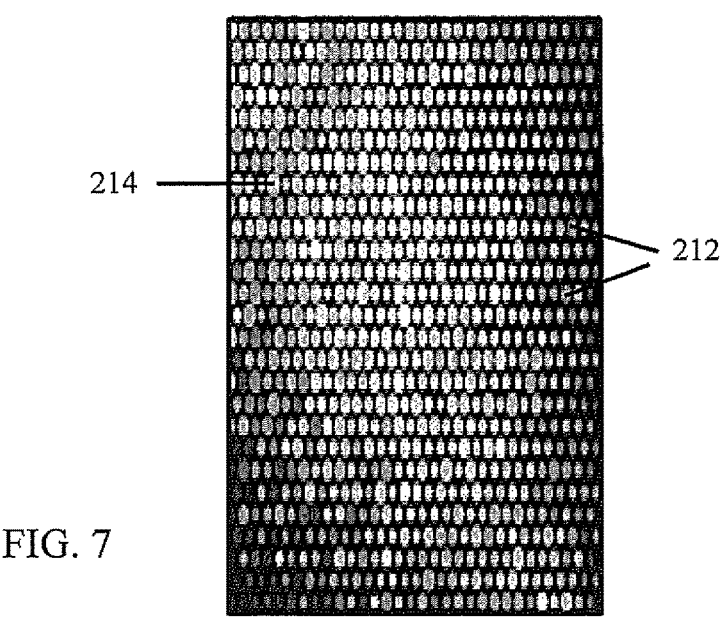
FIG. 7 is an example of a gas diffusion layer having apertures of varying diameter.

Rather than corresponding the apertures 212 directly to the location of the active catalyst particles 104, the apertures 212 can be uniformly located along the gas diffusion layer 210 with the diameter of the apertures 212 varied, with larger apertures 214 formed where active catalyst particles 204 are mapped. An example of varying diameter sizes is illustrated in FIG. 7.

The apertures 212 can be formed in the gas diffusion layer 210 using, for example, lasers, micro-pins or a mold. Computer-directed puncturing of the carbon paper can be used. With this technique, the computer can adjust the location of apertures 212 and/or the diameter based on the map 206. Alternatively, the computer can direct the formation of an aperture 212 as active catalyst particles 204 are detected during the scan, eliminating the need for the map 206. Alternative methods of forming the apertures 212 known to those skilled in the art can be used.

The gas diffusion layer can also be formed of carbon paper with carbon nanotubes inserted where oxidant flow is desired based on where the active catalyst particles are mapped. Alternatively or additionally, the carbon nanotubes can have varying diameters across the surface area of the gas diffusion layer, the different diameters selected based on the depth and/or size of active catalyst particles 104.

Figure 8:
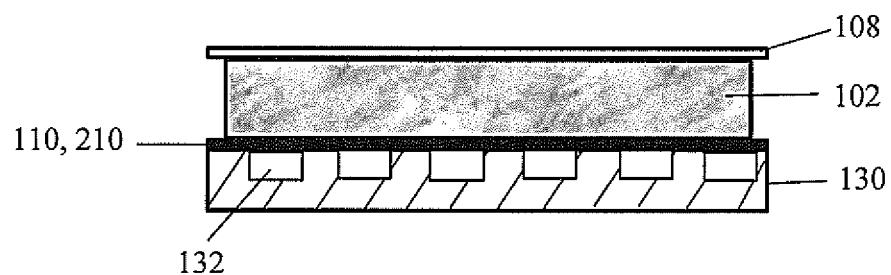
FIG. 8 is a cross-section of a membrane electrode assembly having a gas diffusion layer with both a carbon layer and a plate.

In the examples provided in FIGS. 4-7, the gas diffusion layer 110, 210 can further comprise a plate 130 having channels 132, shown in FIG. 8, that receive oxidant from an oxidant supply and distribute the oxidant to the carbon fiber, carbon paper or carbon nanotubes, which further targets the oxidant distribution as described herein.

In other embodiments of the electrode, the gas diffusion layer may be a plate formed with channels that target oxidant distribution based on the map of the active catalyst particles 104. The plate can be used alone as the gas diffusion layer or can be used in combination with a layer of carbon, such as carbon paper or carbon fiber. If the plate is used alone, the catalyst layer 102 is formed on either the membrane 108 or another substrate and transferred to the membrane 108.

Figure 9:
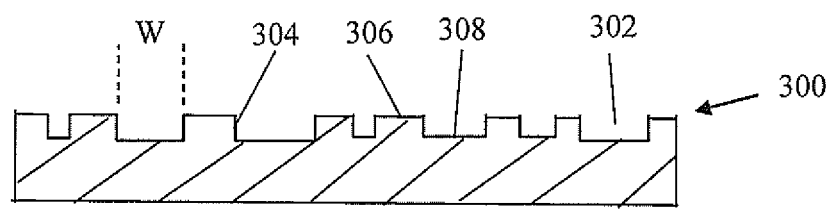
FIG. 9 is a cross-section of an embodiment of a plate as disclosed herein.
Figure 10:
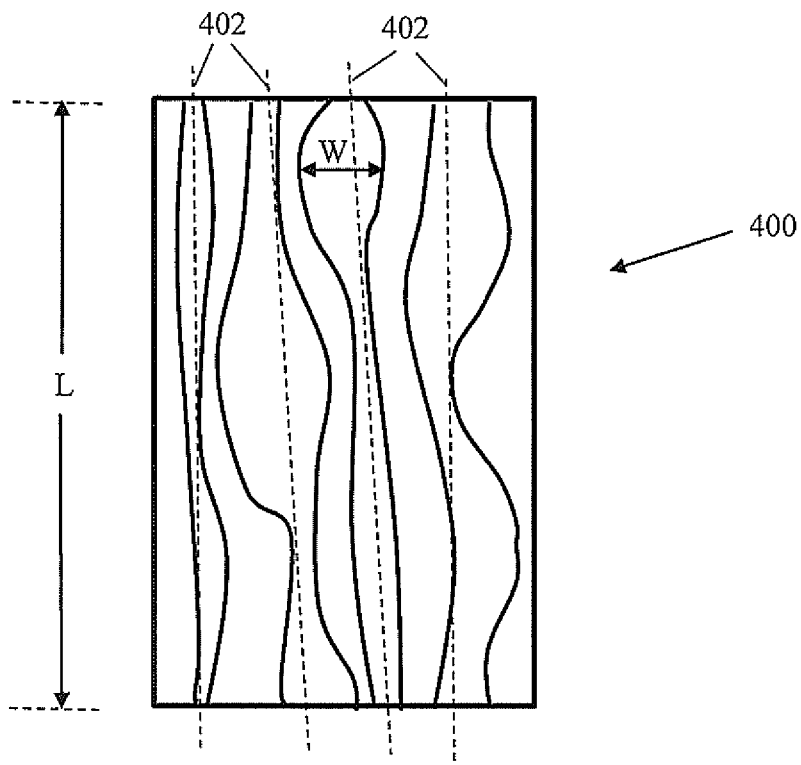
FIG. 10 is a plane view of another embodiment of a plate having channels with varying widths as disclosed herein.

FIGS. 9 and 10 illustrate gas diffusion layers as plates formed in step S16 to concentrate gas distribution to the detected active catalyst particles 104 based on the map 106, 206. Concentrating the gas distribution can be achieved by forming gas flow channels along the plate that are individually designed to vary gas velocity based on the mapped active catalyst particles 104. The plates can be hard carbon or metal, as non-limiting examples. The plates with the individually designed channels can be formed with the different embodiments of channels using, as non-limiting examples, 3D printing, etching, and molding.

As illustrated in FIG. 9, the plate 300 has a plurality of gas flow channels 302. Each gas flow channel 302 is formed with a width W determined based on one or more of location, size and depth, i.e., concentration, of mapped active catalyst particles 104. The width W of a respective gas flow channel 302 is larger in areas with the higher concentration of the mapped active catalyst particles 104. The gas flow channels 302 illustrated in FIG. 9 have side walls 304 that are perpendicular to the catalyst-facing surface 306, but this is not necessary. Side walls 304 can be angled so that the width of the channel 302 is greatest at the catalyst-facing surface 306 and smallest at the base 308 of the channel 302. The greater the concentration of active catalyst particles 104 along a gas flow channel 302, the wider the channel 302 will be formed. The greater the width W, the slower the velocity of the oxidant flow through the channel 302.

In the plate 400 of FIG. 10, each gas flow channel 402, illustrated with a broken line along a length L of each channel 402 for clarity, is formed with a width W that varies along the length L of the channel 402. The width W of a respective gas flow channel 402 is formed widest at a point where a concentration of the mapped active catalyst particles 104 is greatest. As the width W of a channel 402 increases, the velocity of the oxidant flowing through the channel 402 slows, providing time for oxygen to penetrate into the catalyst layer 102. The flow of the oxidant increases as the width W of the channel 402 narrows.

For simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of preparing an electrode having targeted oxygen transport, the method comprising:
applying a catalyst layer having active catalyst particles on a substrate;
scanning the applied catalyst layer to detect the active catalyst particles in the catalyst layer;
mapping the detected active catalyst particles;
forming a gas diffusion layer configured to concentrate gas distribution to the detected active catalyst particles based on the map.

2. The method of claim 1, wherein forming the gas diffusion layer to concentrate gas distribution comprises forming the gas diffusion layer with a first porosity where the active catalyst particles are mapped and with a second porosity where the active catalyst particles are not mapped, the first porosity being greater than the second porosity.

3. The method of claim 2, wherein the gas diffusion layer is formed of carbon fiber, and concentrating gas distribution comprises providing carbon fiber with a first density of fibers where the active catalyst particles are mapped and providing carbon fiber with a second density of fibers where the active catalyst particles are not mapped, the first density being less than the second density.

4. The method of claim 1, wherein the gas diffusion layer is carbon paper, and concentrating gas distribution comprises forming apertures in the carbon paper corresponding to locations where the active catalyst particles are mapped.

5. The method of claim 4, wherein the apertures are formed with varying diameters that correspond to an amount of active catalyst material detected.

6. The method of claim 4, wherein forming the apertures in the carbon paper comprises computer-directed puncturing of the carbon paper.

7. The method of claim 1, wherein forming the gas diffusion layer to concentrate gas distribution comprises forming apertures in the gas diffusion layer, the apertures varying in concentration along a surface area of the gas diffusion layer to correspond to the mapping of the active catalyst particles, the concentration of the apertures lowest where a lowest concentration of active catalyst particles is mapped and greatest where a greatest concentration of the active catalyst particles are mapped.

8. The method of claim 1, wherein the substrate is an electrode membrane.

9. The method of claim 1, wherein the scanning comprises electron scanning.

10. The method of claim 1, wherein the active catalyst particles are fluoresced prior to applying the catalyst layer, and scanning comprises detecting fluorescence of the active catalyst particles.

11. The method of claim 1, wherein the gas diffusion layer is a plate, and wherein concentrating the gas distribution comprises forming gas flow channels along the plate, each gas flow channel is-formed with a width determined based on a concentration of mapped active catalyst particles, wherein the width of a respective gas flow channel is made wider the greater the concentration of the mapped active catalyst particles is adjacent the respective gas flow channel.

12. The method of claim 1, wherein the gas diffusion layer is a plate, and wherein concentrating the gas distribution comprises forming gas flow channels along the plate, each gas flow channel formed with a width that varies along a length of the channel, the width of a respective gas flow channel formed widest at a point where a concentration of the mapped active catalyst particles is greatest.

13. The method of claim 11, wherein forming gas flow channels along the plate comprises three-dimensional printing the plate with the gas flow channels.

14. A method of preparing an electrode having targeted oxygen transport, the method comprising:
  applying a catalyst layer having active catalyst particles on an electrode membrane;
  scanning the applied catalyst layer to detect the active catalyst particles;
  mapping the detected active catalyst particles;
  forming a carbon layer having a gas distribution pattern configured to concentrate gas flow to the detected active catalyst particles based on the map;
  layering the carbon layer on the catalyst layer opposite the electrode membrane; and
  providing a gas diffusion plate on the carbon layer, the gas diffusion plate having gas flow channels configured to deliver gas from an oxidant supply to the catalyst layer.

15. The method of claim 14, wherein forming the carbon layer having the gas diffusion pattern comprises forming the carbon layer with a first porosity where the active catalyst particles are mapped and with a second porosity where the active catalyst particles are not mapped, the first porosity being greater than the second porosity.

16. The method of claim 14, wherein the carbon layer is formed of carbon fiber, and forming the carbon layer having the gas diffusion pattern comprises providing carbon fiber with a first density of fibers where the active catalyst particles are mapped and providing carbon fiber with a second density of fibers where the active catalyst particles are not mapped, the first density being less than the second density.

17. The method of claim 14, wherein the carbon layer is carbon paper, and forming the carbon layer having the gas diffusion pattern comprises forming apertures in the carbon paper corresponding to locations where the active catalyst particles are mapped.

18. The method of claim 17, wherein forming apertures comprises computer-directed puncturing of the carbon paper.

19. The method of claim 14, wherein the active catalyst particles are fluoresced prior to applying the catalyst layer, and scanning comprises detecting fluorescence of the active catalyst particles.

20. The method of claim 12, wherein forming gas flow channels along the plate comprises three-dimensional printing the plate with the gas flow channels.

* * * * *